United States Patent
Gomyo et al.

(10) Patent No.: US 6,793,394 B2
(45) Date of Patent: Sep. 21, 2004

(54) HYDRODYNAMIC BEARING DEVICE

(75) Inventors: Masato Gomyo, Nagano (JP); Kazushi Miura, Nagano (JP)

(73) Assignee: Kabushiki Kaisha Sankyo Seiki Seisakusho, Nagano (JP)

( * ) Notice: Subject to any disclaimer, the term of this patent is extended or adjusted under 35 U.S.C. 154(b) by 62 days.

(21) Appl. No.: 10/197,401

(22) Filed: Jul. 18, 2002

(65) Prior Publication Data

US 2003/0016891 A1 Jan. 23, 2003

(30) Foreign Application Priority Data

Jul. 19, 2001 (JP) .................................... P2001-219175

(51) Int. Cl.[7] .............................................. F16C 17/10
(52) U.S. Cl. ...................... 384/100; 384/123; 384/107; 384/112
(58) Field of Search ............................... 384/100, 121, 384/123, 107, 112

(56) References Cited

U.S. PATENT DOCUMENTS

| | | | | |
|---|---|---|---|---|
| 4,225,196 A | * | 9/1980 | Gray | 384/99 |
| 4,227,752 A | * | 10/1980 | Wilcock | 384/106 |
| 5,433,529 A | * | 7/1995 | Hensel | 384/112 |
| 5,810,479 A | * | 9/1998 | Miyasaka et al. | 384/107 |
| 5,988,886 A | | 11/1999 | Takahashi | |
| 6,250,808 B1 | * | 6/2001 | Ichiyama | 384/100 |
| 6,307,293 B1 | * | 10/2001 | Ichiyama | 310/90.5 |
| 2001/0036327 A1 | * | 11/2001 | Ishikawa et al. | 384/121 |

* cited by examiner

*Primary Examiner*—David A. Bucci
*Assistant Examiner*—Julie K. Smith
(74) *Attorney, Agent, or Firm*—Sughrue Mion, PLLC

(57) ABSTRACT

A pair of thrust hydrodynamic bearing portions are made to communicate with each other to form fluid circulating passages for equalizing a pressure imbalance between both thrust hydrodynamic bearing portions. Even in a case where a pressure imbalance has occurred in a lubricating fluid inside the thrust hydrodynamic bearing portions due to such a cause as the deformation of a thrust plate, the lubricating fluid is allowed to move between the pair of upper and lower thrust hydrodynamic bearing portions through the fluid circulating passages so as to overcome the pressure imbalance, thereby making it possible to stably obtain the amount of floatation in the thrust hydrodynamic bearing portions.

8 Claims, 19 Drawing Sheets

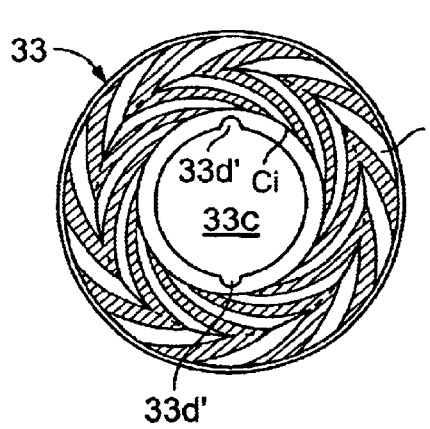 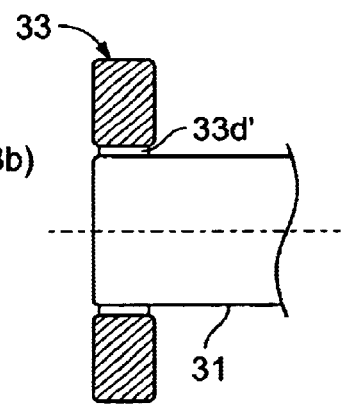
FIG. 20A   FIG. 20B
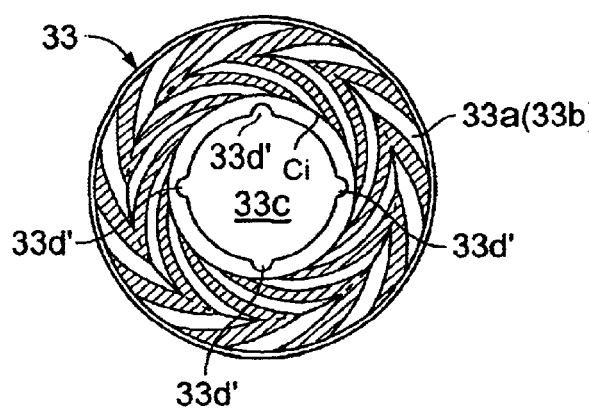 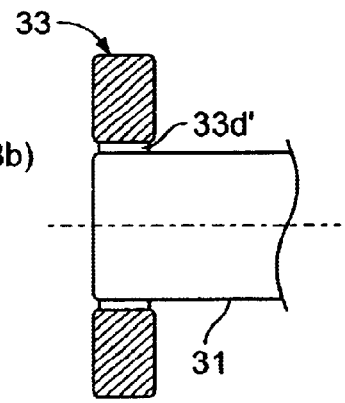
FIG. 21A   FIG. 21B
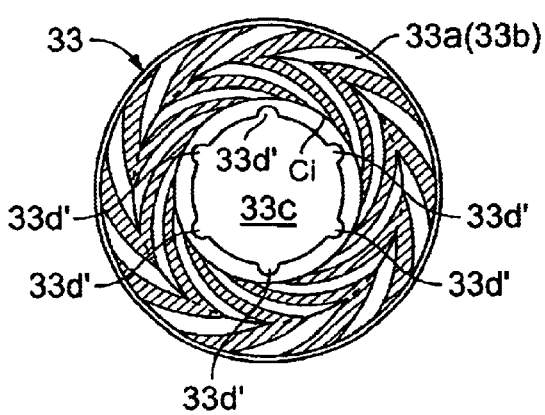 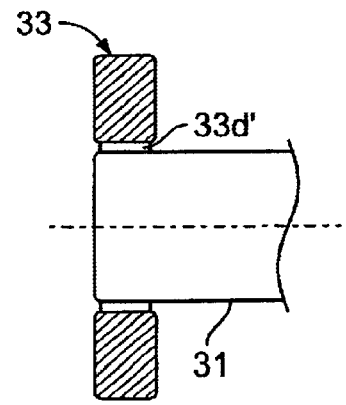
FIG. 22A   FIG. 22B

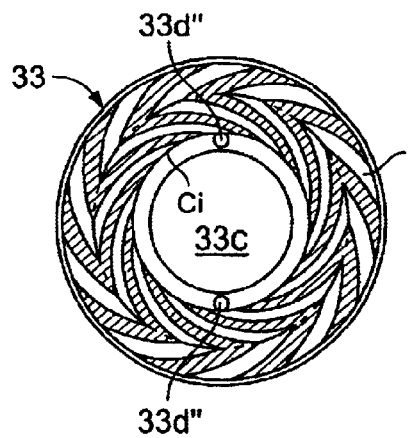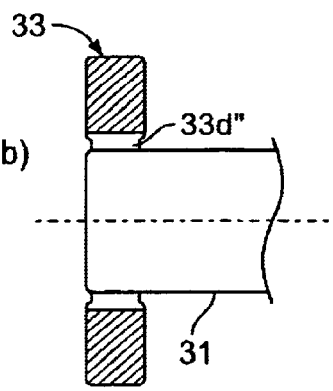
FIG. 23A      FIG. 23B
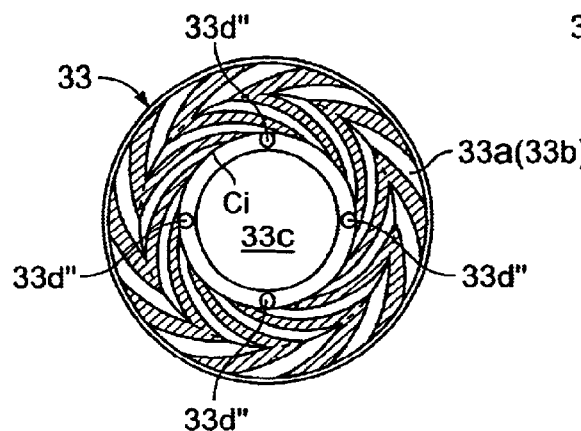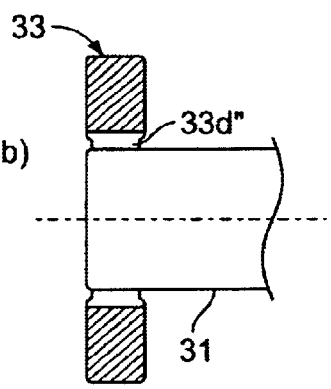
FIG. 24A      FIG. 24B
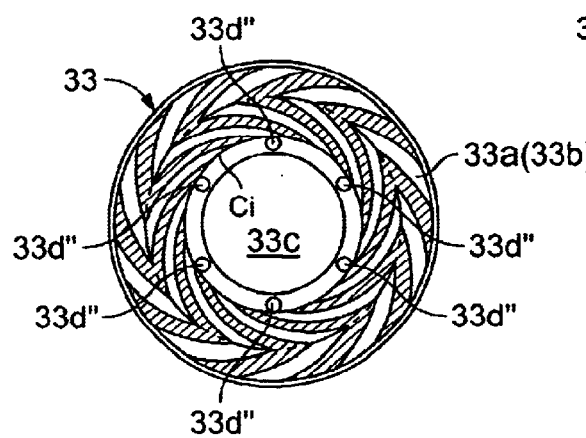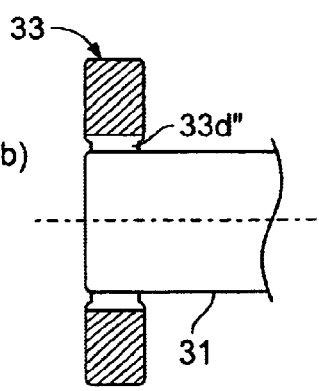
FIG. 25A      FIG. 25B

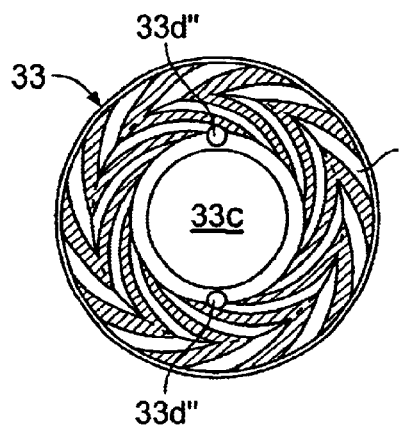 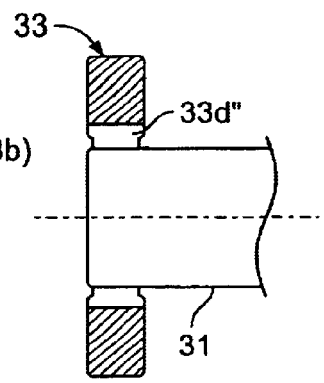
FIG. 26A        FIG. 26B
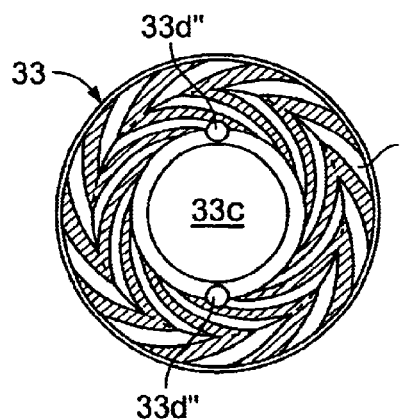 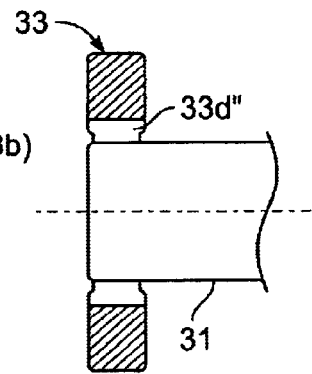
FIG. 27A        FIG. 27B
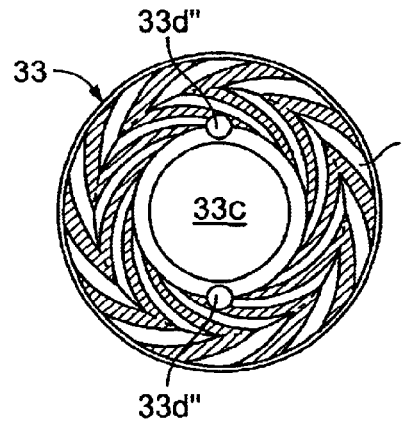 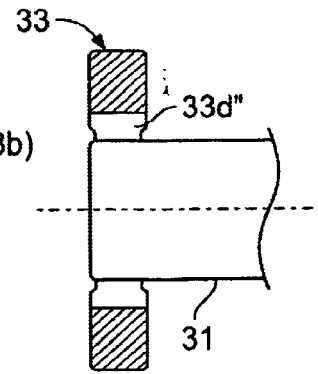
FIG. 28A        FIG. 28B

HYDRODYNAMIC BEARING DEVICE

The present application is based on Japanese Patent Application No. 2001-219175, which is incorporated herein by reference.

BACKGROUND OF THE INVENTION

The present invention relates to a hydrodynamic bearing device in which a shaft member and a bearing member are supported relatively rotatably by dynamic pressure generated in a predetermined lubricating fluid.

In recent years, various proposals have been made concerning hydrodynamic bearing devices for rotatably supporting various rotating members such as magnetic disks, polygonal mirrors, and optical disks at high speed. For example, in a hydrodynamic bearing device adopted for a hard disk drive (HDD) shown in FIG. 29, a rotating shaft (shaft member) 2 is rotatably inserted in a fixed bearing sleeve (bearing member) 1, and a lubricating fluid F such as oil and a magnetic fluid is injected into a very small radial gap between an inner peripheral surface of the bearing sleeve 1 and an outer peripheral surface of the rotating shaft 2, thereby forming two radial bearing portions RB spaced apart in the axial direction.

In addition, as also shown in FIG. 30, a thrust plate 3 is joined to the rotating shaft 2 by such as press fit, shrinkage fit, or screwing down, and both axial end faces of the thrust plate 3, on the one hand, and the bearing sleeve 1 and a counter plate 4 attached to the bearing sleeve 1, on the other hand, are disposed in face-to-face relation with very small gaps interposed therebetween in the axial direction. Further, the lubricating fluid F is injected into the very small gaps in such a manner as to continue from the aforementioned radial bearing portion RB, thereby forming thrust hydrodynamic bearing portions SBa and SBb at two upper and lower areas on both axial sides of the thrust plate 3.

At this juncture, the bearing sleeve 1 is formed so as to shape a bag-like space in which the illustrated upper end side is in an open state while the illustrated lower end side is in a closed state. The illustrated upper ones of radial dynamic-pressure generating grooves RBV1 and RBV2 in two areas respectively formed in the aforementioned radial bearing portions RB have such an asymmetric groove shape as to generate a pumping force acting toward the illustrated lower side which is the inner side of the bag-like space of the bearing sleeve 1. It should be noted that the respective dynamic-pressure generating grooves formed in each of other hydrodynamic bearing portions are formed in symmetrical shapes, and are arranged to generate only the internal pressure in the respective hydrodynamic bearing portions.

Meanwhile, a rotating hub 5 for holding an unillustrated recording disks joined to the illustrated upper portion of the rotating shaft 2 by such as press fit or shrinkage fit, and the holding of the recording disk is effected by a damper (not shown) screwed down to the illustrated upper end portion of the rotating shaft 2.

However, when the above-described thrust plate 3 is joined to the rotating shaft 2, there are cases where deformation is caused in the thrust plate 3 due to the joining force at that time, so that there is a problem in that the bearing action in the thrust hydrodynamic bearing portions SBa and SBb fails to be satisfactory.

Particularly in a case where the thrust plate 3 is fixed by screwing, there is a high possibility of causing a noticeable problem. However, in a case where, for example, no deformation has occurred in the thrust plate 3 secured by a fixing screw 6 as shown in FIG. 31, the pressurizing force directed toward the radially inward side (pumping-in) in the thrust hydrodynamic bearing portions SBa and SBb and the pressurizing force directed toward the radially outward side (pumping-out) are satisfactorily balanced. Hence, the amount of floatation of the thrust plate 3 in the thrust hydrodynamic bearing portions SBa and SBb assumes an intended state.

However, in a case where deformation has occurred in the thrust plate 3 as shown in FIG. 32 or FIG. 33, the aforementioned pressurizing force directed toward the radially inward side (pumping-in) in the thrust hydrodynamic bearing portions SBa and SBb and the pressurizing force directed toward the radially outward side (pumping-out) assume an unbalanced state. Consequently, it becomes impossible to obtain an intended amount of floatation with respect to the thrust plate 3, and there are cases where the thrust plate 3 is brought into contact with the bearing sleeve 1 or the counter plate 4, leading to a state of rotation stop.

On the other hand, even in a case where constituent parts of the bearing member including the thrust plate 3 have been assembled with high precision, there are cases where variations have occurred in various dimensions such as the length, depth, and width of the herringbone-shaped grooves making up the dynamic-pressure generating mechanism, or in a case where the counter plate 4 attached to the bearing sleeve 1 has undergone deformation at the time of joining or the like. In those cases as well, the pumping forces in the thrust hydrodynamic bearing portions SBa and SBb assume an unbalanced state, so that there is a possibility of incurring a similar problem.

SUMMARY OF THE INVENTION

The object of the invention is to provide a hydrodynamic bearing device which is capable of satisfactorily balancing the pumping forces in the thrust hydrodynamic bearing portions irrespective of the deformation of the thrust plate and other members.

(1) To attain the above object, in the hydrodynamic bearing device of the present invention, the pair of thrust hydrodynamic bearing portions are made to communicate with each other to form a fluid circulating passage for equalizing a pressure imbalance between the pair of thrust hydrodynamic bearing portions. In accordance with the hydrodynamic bearing device having the above-described construction, even in a case where a pressure imbalance has occurred in the lubricating fluid inside the thrust hydrodynamic bearing portion due to such a cause as the deformation of the thrust plate, the lubricating fluid moves between the pair of upper and lower thrust hydrodynamic bearing portions through the fluid circulating passage so as to overcome the imbalance. Consequently, the arrangement provided is such that the amount of floatation in the thrust hydrodynamic bearing portion can be obtained stably.

(2) In the hydrodynamic bearing device, the pair of thrust hydrodynamic bearing portions are made to communicate with each other to form a fluid circulating passage for equalizing a pressure imbalance between the pair of thrust hydrodynamic bearing portions, the fluid circulating passage is disposed in a region located radially inwardly of an imaginary inner peripheral circle connecting innermost peripheral ends of the radial regions where the dynamic-pressure generating mechanism extends, and the fluid circulating passage is formed such that a flow rate per unit time of the lubricating fluid passing through the fluid circulating passage from one to another one of the pair of thrust hydrodynamic bearing portions becomes greater than the flow rate per unit time of the lubricating fluid passing over a peripheral wall surface of an imaginary circular cylinder which has a bottom surface defined by the imaginary inner peripheral circle and has a relative amount of floatation as the height thereof.

In accordance with the hydrodynamic bearing device having the above-described construction, even in a case where a pressure imbalance has occurred in the lubricating fluid inside the thrust hydrodynamic bearing portion due to such a cause as the deformation of the thrust plate, the lubricating fluid moves smoothly between the pair of upper and lower thrust hydrodynamic bearing portions through the fluid circulating passage having a sufficient flow rate so as to overcome the imbalance. Consequently, the arrangement provided is such that the amount of floatation in the thrust hydrodynamic bearing portion can be obtained very stably.

(3) Further, in addition to the arrangements as described in the above (1) and (2), a radial hydrodynamic bearing portion is provided for pressurizing the lubricating fluid in the thrust hydrodynamic bearing portion toward a radially inward side, and a bearing space extending from the radial hydrodynamic bearing portion to the thrust hydrodynamic bearing portion is formed into a bag-like space whose radial hydrodynamic bearing portion side is open to an outside and whose thrust hydrodynamic bearing portion side is closed. Therefore, the lubricating fluid flows toward the inward side of the thrust hydrodynamic bearing portion, so that the severance of the lubricating fluid in the thrust hydrodynamic bearing portion can be prevented. Thus the arrangement provided is such that each action described above is maintained satisfactorily, and the leakage of the lubricating fluid to the outside is prevented.

(4) In the hydrodynamic bearing device, the pair of thrust hydrodynamic bearing portions are made to communicate with each other to form a fluid circulating passage for equalizing a pressure imbalance between the pair of thrust hydrodynamic bearing portions, the fluid circulating passage is disposed in a region located radially inwardly of an imaginary inner peripheral circle connecting innermost peripheral ends of the radial regions where the dynamic-pressure generating mechanism extends, and a total sum of cross-sectional areas of the fluid circulating passage in a direction perpendicular to a flowing direction of the lubricating fluid is set to be not less than 3/1000 of the area of the radial regions where the dynamic-pressure generating mechanism extends. In accordance with the hydrodynamic bearing device having the above-described construction, even in a case where a pressure imbalance has occurred in the lubricating fluid inside the thrust hydrodynamic bearing portion due to such a cause as the deformation of the thrust plate, the lubricating fluid moves smoothly between the pair of upper and lower thrust hydrodynamic bearing portions through the fluid circulating passage so as to overcome the imbalance. Consequently, the arrangement provided is such that the amount of floatation in the thrust hydrodynamic bearing portion can be obtained stably.

(5) Further, in addition to the arrangement provided in (4), the fluid circulating passage is defined by an outer peripheral surface of the shaft member and an inner peripheral wall surface of a groove portion formed by notching an innermost peripheral portion of the thrust plate in such a manner as to be open to the side of the shaft member, and the total sum of the cross-sectional areas of the fluid circulating passage in the direction perpendicular to the flowing direction of the lubricating fluid is set to be not more than 1/50 of the area of the radial regions where the dynamic-pressure generating mechanism extends. Therefore, even if the fluid circulating passage is formed in such a manner as to notch the inner peripheral wall surface of the thrust plate, the joining strength with respect to the shaft member is maintained satisfactorily.

BRIEF DESCRIPTION OF THE DRAWINGS

FIGS. 4A to 4C are diagrams illustrating a state in which the thrust plate used in the hydrodynamic bearing device shown in FIG. 1 is attached to a rotating shaft, in which FIG. 4A is an explanatory plan view, FIG. 4B is an explanatory side view, and FIG. 4C is an explanatory bottom view;

FIGS. 13A to 13C are diagrams illustrating a state in which the thrust plate used in the hydrodynamic bearing device in accordance with another embodiment is attached to the rotating shaft, in which FIG. 13A is an explanatory plan view, FIG. 13B is an explanatory side view, and FIG. 13C is an explanatory bottom view;

FIGS. 20A and 20B are diagrams illustrating the structure of the fluid circulating passages in accordance with a further embodiment of the invention, in which FIG. 20A is an explanatory plan view of the thrust plate, and FIG. 20B is an explanatory side sectional view illustrating a state of joining a shaft member;

FIGS. 21A and 21B are diagrams illustrating the structure of the fluid circulating passages in accordance with a further embodiment of the invention, in which FIG. 21A is an explanatory plan view of the thrust plate, and FIG. 21B is an explanatory side sectional view illustrating a state of joining the shaft member;

FIGS. 22A and 22B are diagrams illustrating the structure of the fluid circulating passages in accordance with a further embodiment of the invention, in which FIG. 22A is an explanatory plan view of the thrust plate, and FIG. 22B is an explanatory side sectional view illustrating a state of joining the shaft member;

FIGS. 23A and 23B are diagrams illustrating the structure of the fluid circulating passages in accordance with a further embodiment of the invention, in which FIG. 23A is an explanatory plan view of the thrust plate, and FIG. 23B is an explanatory side sectional view illustrating a state of joining the shaft member;

FIGS. 24A and 24B are diagrams illustrating the structure of the fluid circulating passages in accordance with a further embodiment of the invention, in which FIG. 24A is an explanatory plan view of the thrust plate, and FIG. 24B is an explanatory side sectional view illustrating a state of joining the shaft member;

FIGS. 25A and 25B are diagrams illustrating the structure of the fluid circulating passages in accordance with a further embodiment of the invention, in which FIG. 25A is an explanatory plan view of the thrust plate, and FIG. 25B is an explanatory side sectional view illustrating a state of joining the shaft member;

FIGS. 26A and 26B are diagrams illustrating the structure of the fluid circulating passages in accordance with a further embodiment of the invention, in which FIG. 26A is an explanatory plan view of the thrust plate, and FIG. 26B is an explanatory side sectional view illustrating a state of joining the shaft member;

FIGS. 27A and 27B are diagrams illustrating the structure of the fluid circulating passages in accordance with a further embodiment of the invention, in which FIG. 27A is an explanatory plan view of the thrust plate, and FIG. 27B is an explanatory side sectional view illustrating a state of joining the shaft member;

FIGS. 28A and 28B are diagrams illustrating the structure of the fluid circulating passages in accordance with a further embodiment of the invention, in which FIG. 28A is an explanatory plan view of the thrust plate, and FIG. 28B is an explanatory side sectional view illustrating a state of joining the shaft member;

DETAILED DESCRIPTION OF THE PREFERRED EMBODIMENTS

Hereafter, a description will be given of the embodiments of the invention, but prior to that a description will be first given of the entire structure of a hard disk drive (HDD) to which the invention is applied.

Figure 1:
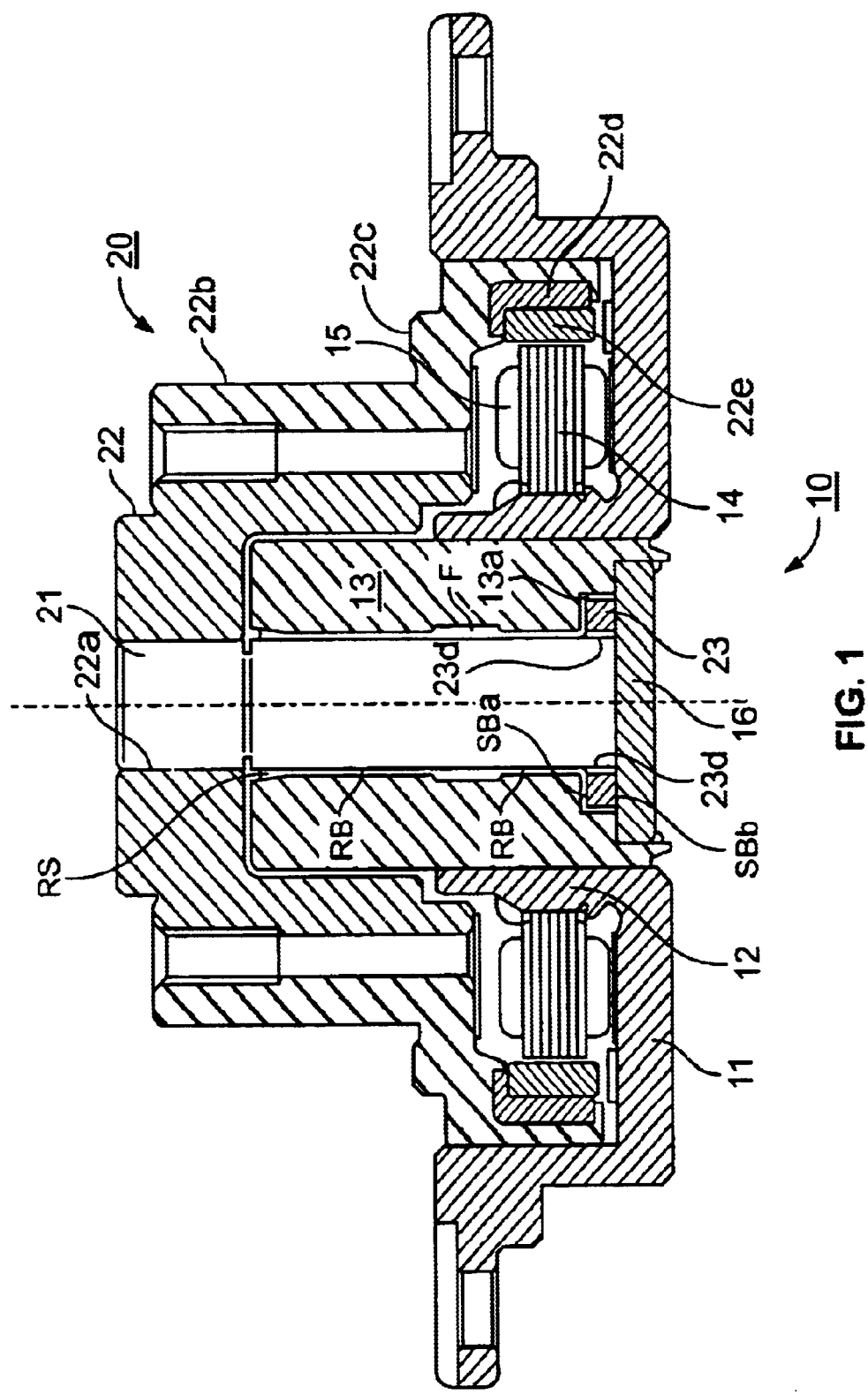
FIG. 1 is an explanatory vertical sectional view illustrating an example of the entire structure of a hard disk drive (HDD) having a shaft rotating-type hydrodynamic bearing device to which the invention is applied.
Figure 2:
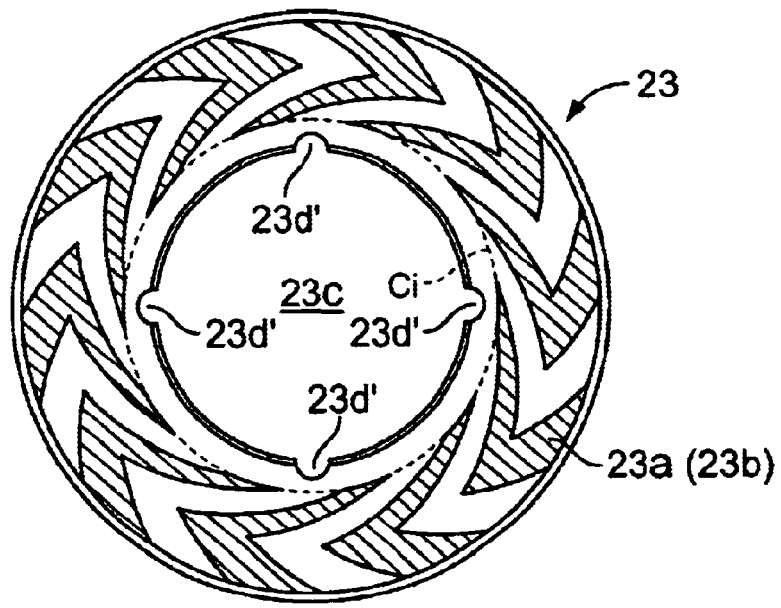
FIG. 2 is an explanatory plan view illustrating the structure of a thrust plate used in the hydrodynamic bearing device shown in FIG. 1.
Figure 3:
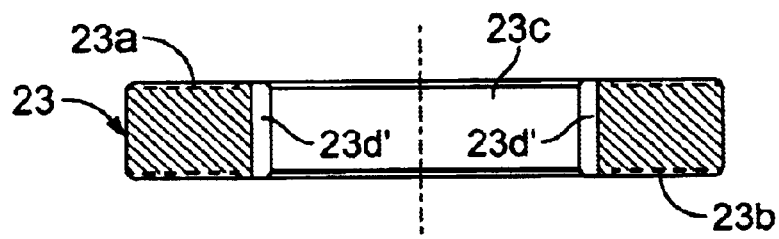
FIG. 3 is an explanatory cross-sectional view of the thrust plate used in the hydrodynamic bearing device similarly shown in FIG. 1.
Figure 4A:
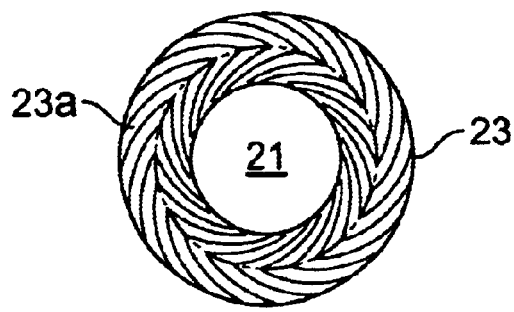
Figure 4B:
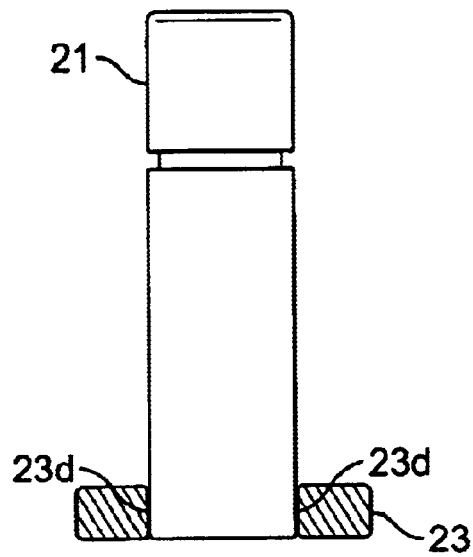
Figure 4C:
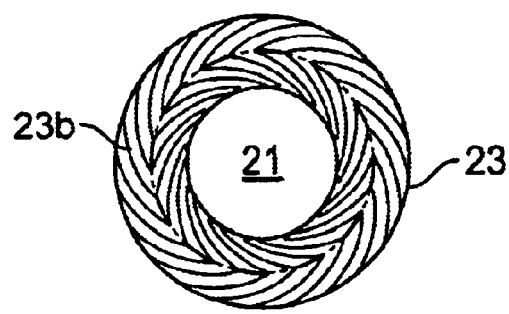

The axially rotating HDD spindle motor shown in FIG. 1 as a whole consists of a stator set 10 serving as a fixed member and a rotor set 20 serving as a rotating member assembled to the stator set 10 from an upper side in the drawing. Of these sets, the stator set 10 has a fixing frame 11 which is screwed down to an unillustrated fixed base side. This fixing frame 11 is formed of an aluminum-base metal material to attain light weight. On an inner peripheral surface side of an annular bearing holder 12 formed uprightly on a substantially central portion of the fixing frame 11, a bearing sleeve 13 serving as a fixed bearing member formed in a hollow cylindrical shape is joined to the bearing holder 12 by press fit or shrinkage fit. This bearing sleeve 13 is formed of a copper-base material such as phosphor bronze for facilitating such as the machining of a small-diameter hole.

In addition, a stator core 14 consisting of a laminated body of electromagnetic steel sheets is fitted to an outer peripheral attaching surface of the bearing holder 12. Drive coils 15 are respectively wound around salient pole portions provided in this stator core 14.

Further, a rotating shaft 21 constituting a part of the aforementioned rotor set 20 is rotatably inserted in a central hole provided in the bearing sleeve 13, Namely, the dynamic pressure surface formed on an inner peripheral wall portion of the bearing sleeve 13 is arranged to radially oppose via a very small gap the dynamic pressure surface formed on an outer peripheral surface of the rotating shaft 21, and a radial hydrodynamic bearing portion RB is formed in that very small gap portion. More specifically, the dynamic pressure surface on the bearing sleeve 13 side and the dynamic pressure surface on the rotating shaft 21 side in the above-described radial hydrodynamic bearing portion RB are arranged in such a manner as to oppose each other circumferentially with a very small gap of several microns therebetween. A lubricating fluid F such as lubricating oil, a magnetic fluid, or air is injected into or interposed in the bearing space constituted by that very small gap in such a manner as to continue in the axial direction.

Figure 30:
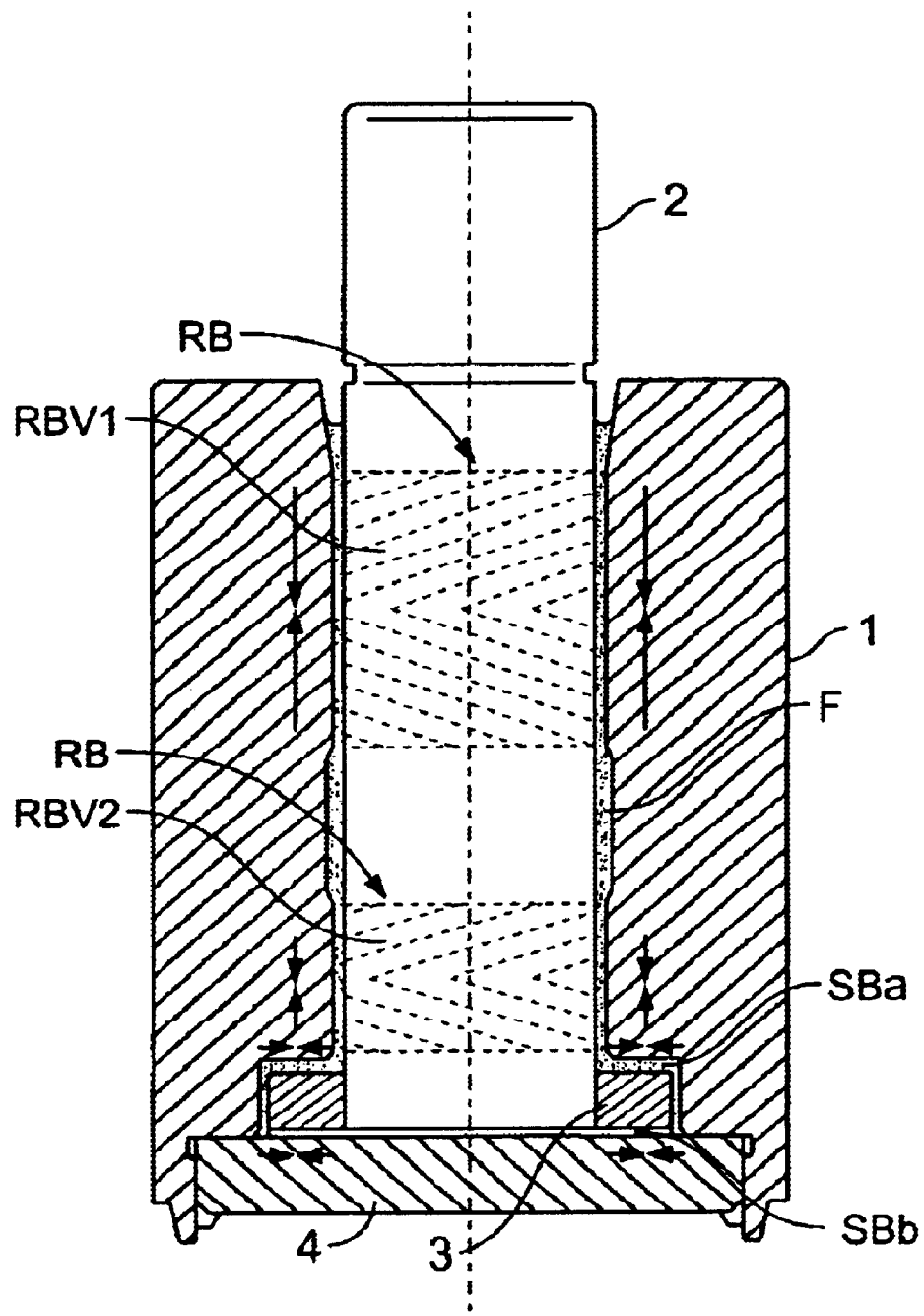
FIG. 30 is an explanatory enlarged vertical sectional view illustrating essential portions of the hydrodynamic bearing device having a pumping-in structure.

Further, radial dynamic-pressure generating grooves (see reference numerals RBV1 and RBV2 in FIG. 30) having, for instance, a herringbone shape are cut annularly in at least one of the dynamic pressure surfaces of the bearing sleeve 13 and the rotating shaft 21 in such a manner as to be divided into two blocks in the axial direction. The arrangement provided is such that, at the time of rotation, the lubricating fluid F is pressurized by the pumping action of the radial dynamic-pressure generating grooves to generate dynamic pressure, and a rotating hub 22, which will be described later, together with the rotating shaft 21 is axially supported by the dynamic pressure of the lubricating fluid F in a state of non-contact in the radial direction with respect to the bearing sleeve 13.

At this time, as will be described later, the bearing sleeve 13 is formed so as to shape a bag-like space in which the illustrated upper end side is in an open state while the illustrated lower end side is in a closed state. The aforementioned radial dynamic-pressure generating grooves are formed such that, in the same way as in FIG. 30, the illustrated upper ones of the radial dynamic-pressure generating grooves in two areas have such an asymmetric groove shape as to generate a pumping force acting toward the illustrated lower side which is the inner side of the bag-like space of the bearing sleeve 13.

In addition, a capillary seal portion RS is disposed in the illustrated upper end portion of the bearing space making up the respective aforementioned radial hydrodynamic bearing portions RB. This capillary seal portion RS is formed such that the gap is gradually enlarged toward the outer side of the bearing by an inclined surface formed on the rotating shaft 21 side or the bearing sleeve 13 side, and is set to 20 $\mu$m to 300 $\mu$m, for example. The arrangement provided is such that the gas-liquid interface of the lubricating fluid F is located in this capillary seal portion RS in both cases where the motor is rotating and is at rest.

Further, the rotating hub 22 constituting a part of the rotor set 20 together with the rotating shaft 21 is formed by a substantially cup-shaped member made of an aluminum-base metal, and a joining hole 22a provided in a central portion of the rotating hub 22 is integrally joined to the illustrated upper end portion of the rotating shaft 21 by press fit or shrinkage fit. This rotating hub 22 has a substantially cylindrical trunk portion 22b for mounting a recording medium disk such as a magnetic disk on its outer peripheral portion, and has a disk mounting portion 22c jutting radially outward from the trunk portion 22b to axially support the recording medium disk. The fixation of the recording medium disk is effected by the pressing force of an unillustrated clamper.

In addition, an annular driving magnet 22e is attached to an inner peripheral wall surface side of the illustrated lower side of the trunk portion 22b of the rotating hub 22 via a back yoke 22d. This annular driving magnet 22e is disposed in close proximity to an outer peripheral end surface of the aforementioned stator core 14 so as to annularly oppose it.

Meanwhile, as shown in FIGS. 2 to 4C as well, a disk-shaped thrust plate 23 is secured to a tip portion of the illustrated lower end side (FIG. 4B) of the rotating shaft 21 by shrinkage fit or press fit. This thrust plate 23 is disposed so as to be accommodated in a cylindrical recessed portion 13a provided in the illustrated lower end side of the central hole of the bearing sleeve 13. In the recessed portion 13a of the bearing sleeve 13, the dynamic pressure surface provided on the illustrated upper side surface of the thrust plate 23 is disposed in face-to-face relation to the dynamic pressure surface provided in the recessed portion 13a of the bearing sleeve 13, so as to be located in axially close proximity thereto. Further, thrust dynamic-pressure generating grooves 23a having a herringbone shape are formed in the illustrated upper dynamic pressure surface of the thrust plate 23, and an upper thrust hydrodynamic bearing portion SBa (see FIG. 1) is formed in the gap portion of the opposing dynamic pressure surfaces of the thrust plate 23 and the bearing sleeve 13. The dynamic-generating grooves 23a constitute a dynamic-pressure generating mechanism.

Furthermore, a counter plate 16 formed by a relatively large-diameter disk-shaped member is disposed so as to be in close proximity to the illustrated lower dynamic pressure surface of the thrust plate 23. This counter plate 16 is disposed so as to close an opening portion of the lower end side of the bearing sleeve 13, and an outer peripheral side portion of the counter plate 16 is fixed to the bearing sleeve 13 by calking or the like.

In addition, thrust dynamic-pressure generating grooves 23b having a herringbone shape are formed in the illustrated lower dynamic pressure surface of the thrust plate 23, thereby forming a lower thrust hydrodynamic bearing portion SBb. The dynamic-generating grooves 23b constitute a dynamic-pressure generating mechanism.

Both dynamic pressure surfaces on the thrust plate 23 side making up the set of thrust hydrodynamic bearing portions SBa and SBb which are thus disposed adjacent to each other in the axial direction, as well as both dynamic pressure surfaces on the bearing sleeve 13 side and the counter plate 16 side, which oppose them in close proximity, are respectively disposed in such a manner as to oppose each other in the axial direction with a very small gap of several microns therebetween. At the same time, the lubricating fluid F such as oil, a magnetic fluid, or air is injected into or interposed in each bearing space constituted by the very small gap in such a manner as to continue in the axial direction. The arrangement provided is such that, at the time of rotation, the lubricating fluid F is pressurized by the pumping action of the thrust dynamic-pressure generating grooves 23a and 23b to generate dynamic pressure, and the rotating shaft 21 and rotating hub 22 are axially supported by the dynamic pressure of the lubricating fluid F in a state of non-contact in which these members are floating in the thrust direction.

At this time, as described before, the radial dynamic-pressure generating grooves in the radial hydrodynamic bearing portion RB have such an asymmetric groove shape as to generate a pumping force toward the illustrated lower side which is the inner side of the bag-like space of the bearing sleeve 13. Therefore, the lubricating fluid F is pressurized toward the central sides of the aforementioned thrust hydrodynamic bearing portions SBa and SBb, so that the lubricating fluid flows satisfactorily through fluid circulating passages (23d) which will be described later.

In addition, as for the thrust plate 23, an attaching hole portion 23c which is formed by being bored axially through a central portion of the thrust plate 23 is joined and secured to the rotating shaft 21 by interference fit such as shrinkage fit or press fit. Groove portions 23d' extending in the axial direction are cut in an inner peripheral wall surface of the attaching hole portion 23a in such a manner as to be notched. These groove portions 23d' are formed at four spots at equal intervals of about 90 degrees in the circumferential direction, and the cross-sectional shape of each of the groove portions 23d' is made into a substantially semicircular shape formed so as to be open to the rotating shaft 21 side. In addition, the fluid circulating passages 23d extending in the axial direction are defined by the groove portions 23d' and the outer peripheral surface of the rotating shaft 21, whereby the aforementioned pair of thrust hydrodynamic bearing portions SBa and SBb are arranged to communicate with each other in the axial direction. Thus the arrangement provided is such that the pressure imbalance of the lubricating fluid F occurring between both thrust hydrodynamic bearing portions SBa and SBb is brought into an equilibrium with respect to each other.

Thus, in forming the groove portions 23d' constituting the fluid circulating passages 23d in this embodiment, it suffices to form grooves in the inner peripheral wall surface of the attaching hole portion 23c of the thrust plate 23 by means of such as a wire saw which may be used in cutting a silicon wafer, unlike the case where small-diameter holes are formed by being bored by a drill or the like, so that this process excels in productivity and is advantageous in terms of cost. In addition, since it becomes possible to separately process the individual members, i.e., the rotating shaft 21 and the thrust plate 23, it is possible to fabricate the respective members with high precision, and an assembly obtained by combining them is also finished with high precision. Further, it is possible to adopt press working in the fabrication of the thrust plate 23.

More specifically, the groove portions 23d' making up the four fluid circulating passages 23d are disposed in a region located radially inwardly of an imaginary inner peripheral circle Ci connecting innermost peripheral ends of radial regions where the aforementioned thrust dynamic-pressure generating grooves 23a and 23b extend. By disposing the groove portions 23d' in this manner, with most motors, the positions where the fluid circulating passages 23d are formed are disposed radially inwardly of the outer peripheral side of the gas-liquid interface of the lubricating fluid F in the capillary seal portion RS provided at the upper end portion of the radial hydrodynamic bearing portion RB. Therefore, the radius of curvature of the liquid level of the lubricating fluid F in the capillary seal portion RS is set in a relationship of being greater than the radius of curvature of the liquid level in the lubricating fluid F in the fluid circulating passages 23d. If these radii of curvature are set in such a dimensional relationship, it is possible to promote the extinction of bubbles in the lubricating fluid F.

In addition, the cross-sectional shape and the cross-sectional area of each of the fluid circulating passages 23d are set such that the flow rate of the lubricating fluid F which flows through the relevant fluid circulating passage 23d from one side to the other side of the pair of thrust hydrodynamic bearing portions SBa and SBb becomes greater than or equal to a necessary and sufficient reference flow rate V. Specifically, the aforementioned the cross-sectional shape and cross-sectional area are set such that the flow rate of the lubricating fluid F per unit time when all the four fluid circulating passages 23d are combined becomes greater than or equal to a necessary and sufficient reference flow rate V. In a case where an imaginary circular cylinder is considered which has a bottom surface defined by the aforementioned imaginary inner peripheral circle Ci and has as its height a relative amount of floatation H of the thrust plate 23 during the steady rotation of the motor, the reference flow rate V referred to herein is set as the flow rate per unit time of the lubricating fluid F which passes over the peripheral wall surface of the imaginary circular cylinder.

In this embodiment having the above-described construction, even in a case where a pressure imbalance has occurred in the lubricating fluid F inside the thrust hydrodynamic bearing portions SBa and SBb due to such a cause as the deformation of the thrust plate 23, the lubricating fluid F moves smoothly between the pair of upper and lower thrust hydrodynamic bearing portions SBa and SBb through the four fluid circulating passages 23d having a sufficient flow rate. Consequently, the arrangement provided is such that the relative amount of floatation of the thrust plate 23 in the thrust hydrodynamic bearing portions SBa and SBb can be obtained very stably.

Figure 5:
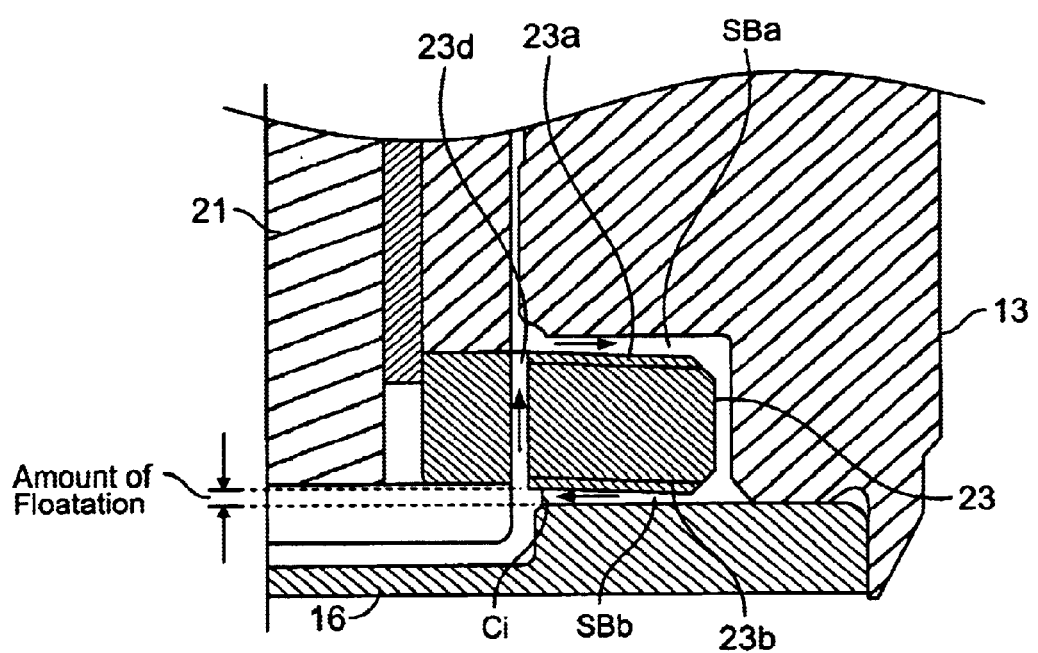
FIG. 5 is an explanatory partially enlarged vertical sectional view showing the pressure balance and moving directions of a lubricating fluid at the time of deformation of the thrust plate used in the hydrodynamic bearing device shown in FIG. 1.

For example, as shown in FIG. 5, in a case where the thrust plate 23 is deformed in such a manner as to be warped toward the counter plate 16 side, the pumping force in the region where the bearing gap is made small by the deformation of the thrust plate 23 increases. At this time, if the aforementioned fluid circulating passages 23d are not provided, the amount of floatation from the counter plate 16 side at the thrust plate 23 increases sharply, which can possibly cause to thrust plate 23 to come into contact with the bearing sleeve 13 side. In contrast, if the fluid circulating passages 23d having a sufficient flow rate are provided in the thrust plate 23, the pressure imbalance between the pair of upper and lower thrust hydrodynamic bearing portions SBa and SBb is immediately overcome, thereby making it possible to obtain a stable amount of floatation. It goes without saying that, at this time, if the amount of floatation of the lubricating fluid F in the fluid circulating passages 23d is too small, the thrust plate 23 assumes an excessively floating state.

Figure 6:
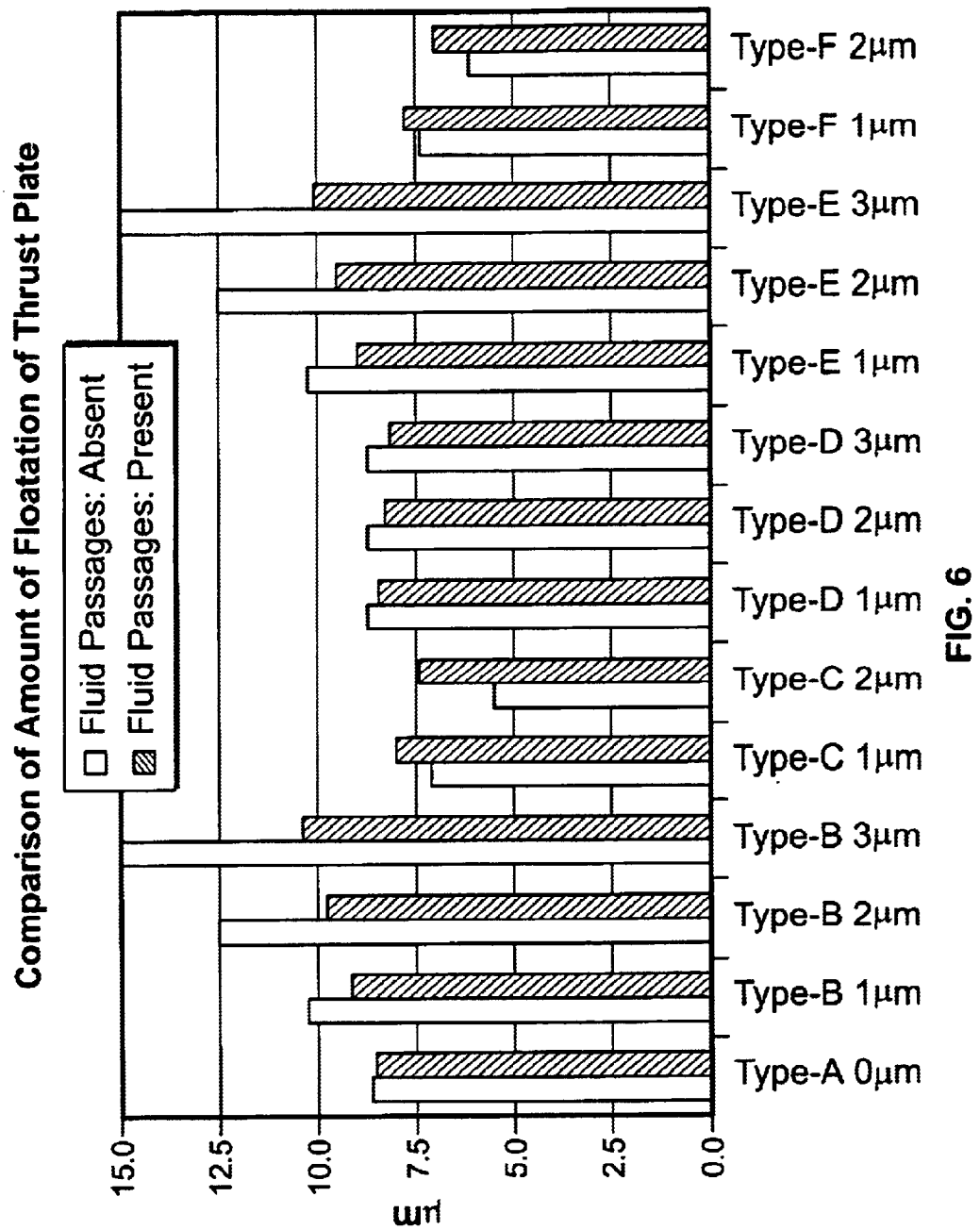
FIG. 6 is a diagram showing the amount of floatation of the thrust plate by type of the state of deformation of the thrust plate through comparison between the case in which fluid circulating passages are absent and the case in which they are present.

FIG. 6 shows the results of measurement (axis of ordinates) of the amount of relative floatation of the thrust plate 23 in the thrust hydrodynamic bearing portions SBa and SBb by type (axis of abscissas) of the state of deformation occurring in the thrust plate 23 or the counter plate 16. In the measurement of the amount of floatation, the conditions of the thrust hydrodynamic bearing portions SBa and SBb are set to be identical for each of type A to type F (the details will be described later), and the basic specifications such as the shape of the herringbone grooves for generating dynamic pressure are made identical for each of the aforementioned types. In addition, the total gap in the axial direction of the pair of upper and lower thrust hydrodynamic bearing portions SBa and SBb is set to an constant 15 $\mu$m for each of the aforementioned types, and the amount of relative floatation of the ordinates shows the amount of floatation of the thrust plate 23 from the counter plate 16.

Figure 7:
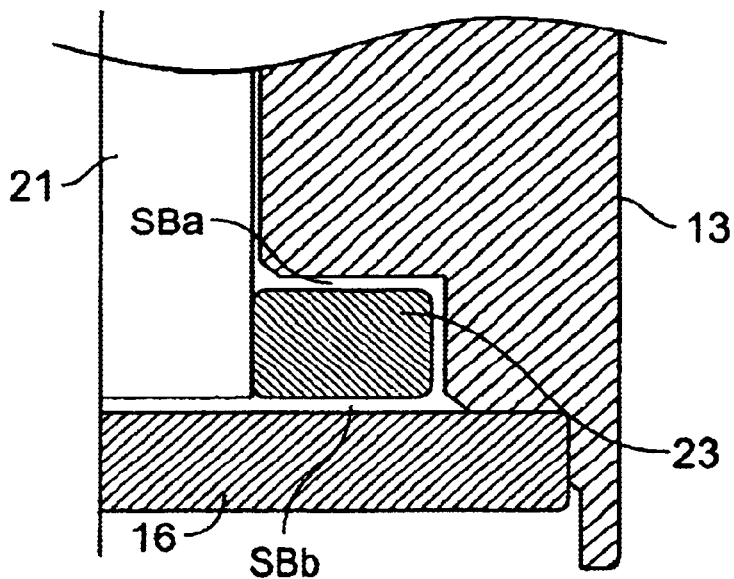
FIG. 7 is an explanatory partially enlarged vertical sectional view illustrating the arrangement and the structure of the thrust plate in type A of the types shown in FIG. 6.

Type A in FIG. 6 shows an ideal state in which no deformation occurs in either the thrust plate 23 or the counter plate 16, as shown in FIG. 7. In this case, since the specifications of the upper and lower thrust hydrodynamic bearing portions SBa and SBb are identical, the final amount of floatation of the thrust plate 23 should be 7.5 $\mu$m which is half the aforementioned total gap of 15 $\mu$m. However, the amount of floatation of the thrust plate 23 from the counter plate 16 is slightly larger than that amount of floatation by the portion of the pumping force (see FIG. 30) which is directed toward the illustrated lower side in the aforementioned radial hydrodynamic bearing portion RB. In such an ideal state, it is possible to obtain a stable amount of floatation irrespective of the presence or absence of the fluid circulating passages 23d.

Figure 8:
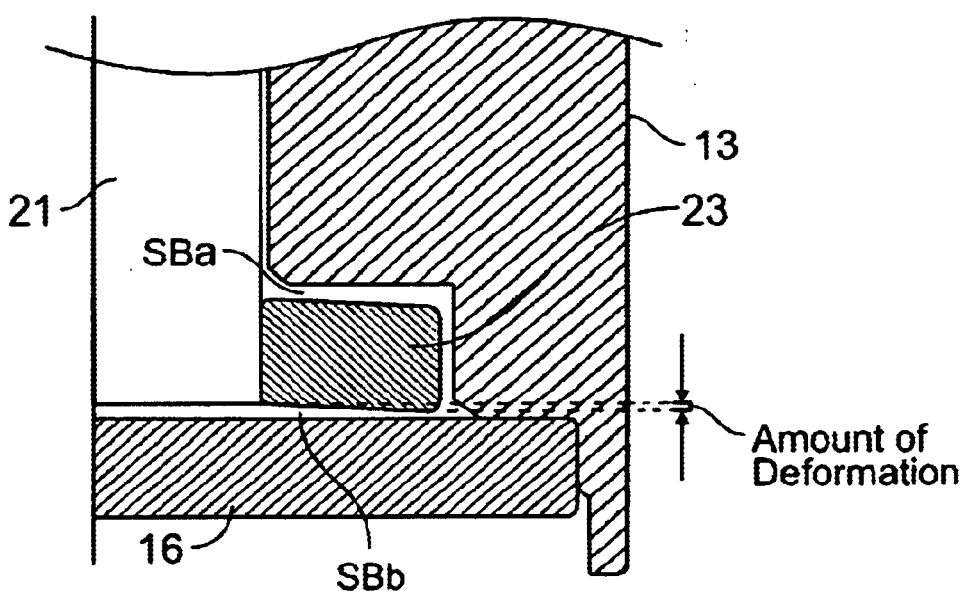
FIG. 8 is an explanatory partially enlarged vertical sectional view illustrating the arrangement and the structure of the thrust plate in type B of the types shown in FIG. 6.

In addition, type B in FIG. 6 shows a state in which the thrust plate 23 has undergone deformation of a shape in which it is warped toward the counter plate 16 side, as shown in FIG. 8. If the amount of such deformation of the thrust plate 23 is varied between 1 $\mu$m and 3 $\mu$m, the greater the amount of deformation, the more the amount of floatation of the thrust plate 23 increases, and the thrust plate 23 ultimately comes into contact with the bearing sleeve 13. Namely, it becomes impossible to obtain the amount of floatation for the illustrated upper thrust hydrodynamic bearing portion SBa. In contrast, in the case of this invention in which the fluid circulating passages 23d are provided, even if the amount of deformation of the thrust plate 23 becomes large, the thrust plate 23 does not come into contact with the bearing sleeve 13.

Figure 9:
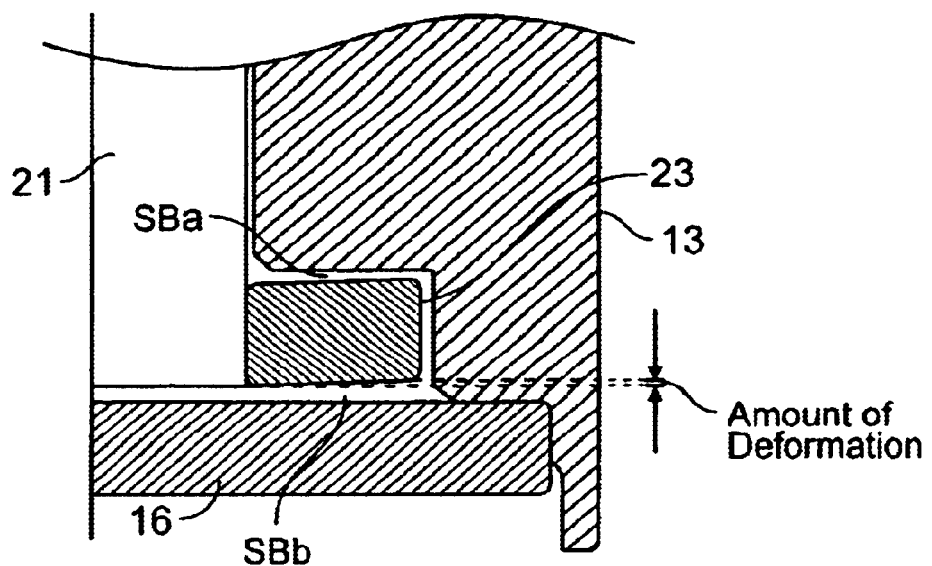
FIG. 9 is an explanatory partially enlarged vertical sectional view illustrating the arrangement and the structure of the thrust plate in type C of the types shown in FIG. 6.

Furthermore, type C in FIG. 6 shows a state in which the thrust plate 23 has undergone deformation of a shape in which it is warped toward the bearing sleeve 13 side, as shown in FIG. 9. The amount of floatation of the thrust plate 23 in this case becomes small on the whole, and the thrust plate 23 approaches the counter plate 16.

Figure 10:
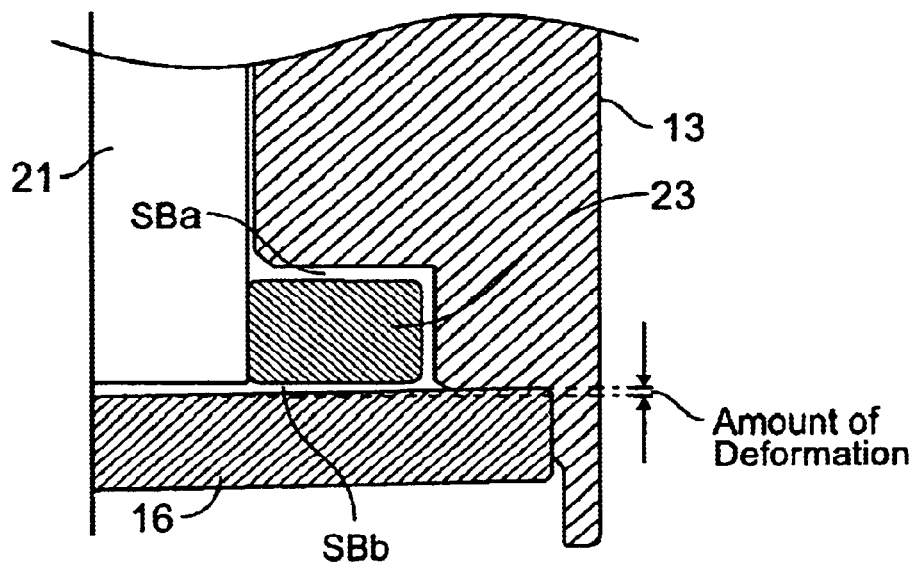
FIG. 10 is an explanatory partially enlarged vertical sectional view illustrating the arrangement and the structure of the thrust plate in type D of the types shown in FIG. 6.

Still further, type D in FIG. 6 shows a state in which the thrust plate 23 has not undergone deformation, but the counter plate 16 has undergone deformation of a shape in which it is warped toward the thrust plate 23 side, as shown in FIG. 10. In this case, even if the amount of deformation of the counter plate 16 has become 3 μm, the amount of floatation is relatively stable.

Figure 11:
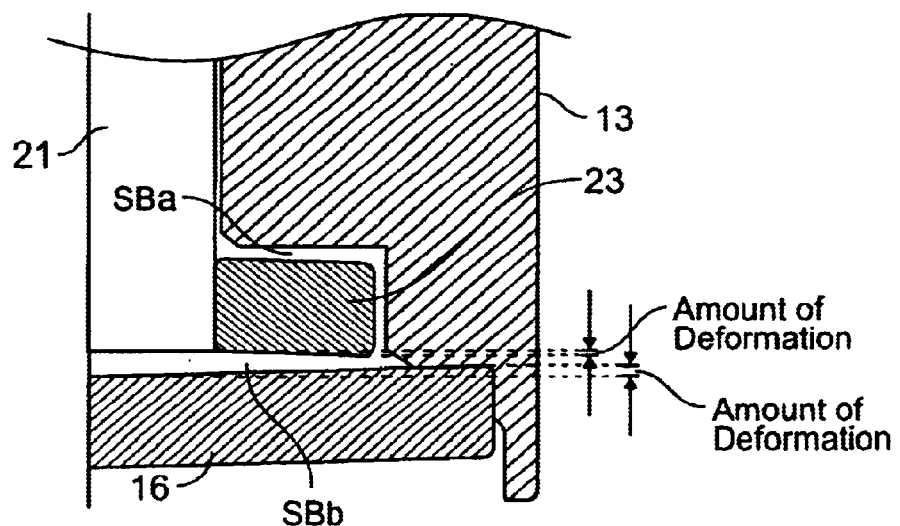
FIG. 11 is an explanatory partially enlarged vertical sectional view illustrating the arrangement and the structure of the thrust plate in type E of the types shown in FIG. 6.
Figure 12:
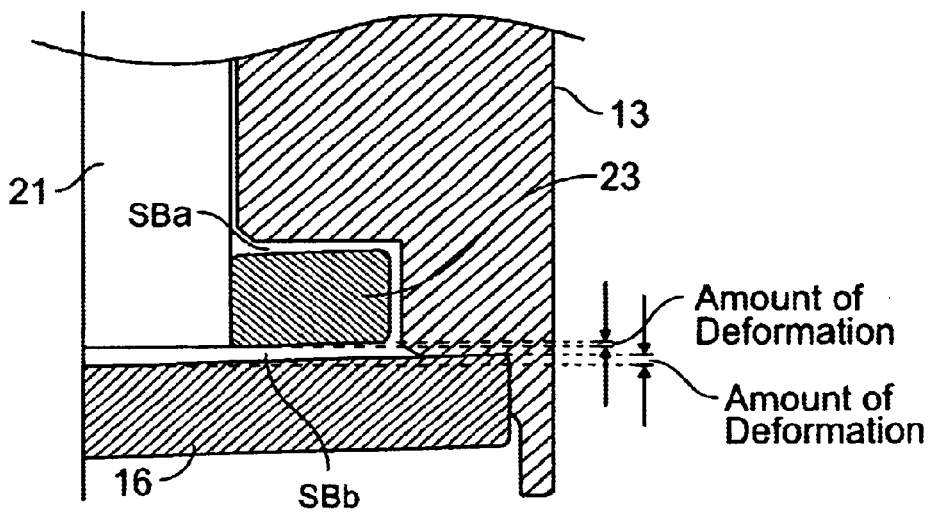
FIG. 12 is an explanatory partially enlarged vertical sectional view illustrating the arrangement and the structure of the thrust plate in type F of the types shown in FIG. 6.

Meanwhile, types E and F in FIG. 6 show states in which deformation has occurred in both the thrust plate 23 side and the counter plate 16 side, as shown in FIGS. 11 and 12, and deformation has occurred in different directions between FIG. 11 and FIG. 12. Even in such states, it can be appreciated that in the case of this invention in which the fluid circulating passages 23d are provided, even if the amount of deformation becomes large, the amount of floatation becomes stabilized.

Figure 13A:
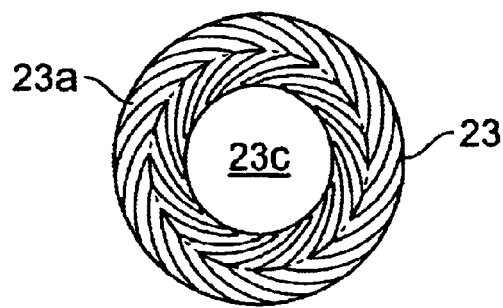
Figure 13B:
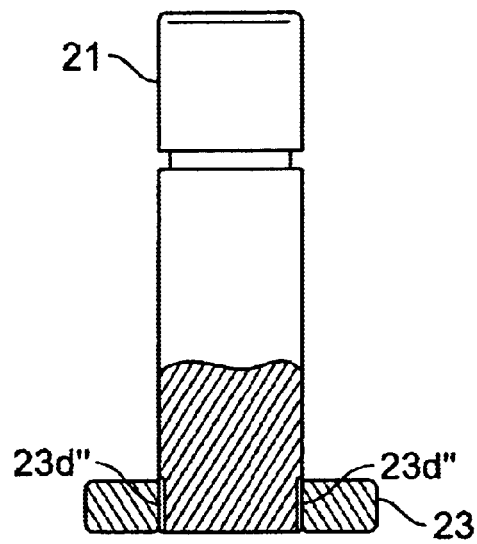
Figure 13C:
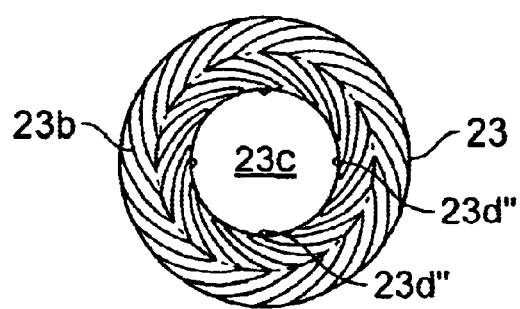

In addition, in another embodiment shown in FIGS. 13A to 13C, the rotating shaft 21 side is provided with groove portions 23d'' making up the fluid circulating passages. In such another embodiment as well, it is possible to obtain action and advantages similar to those of the above-described embodiments.

Figure 14:
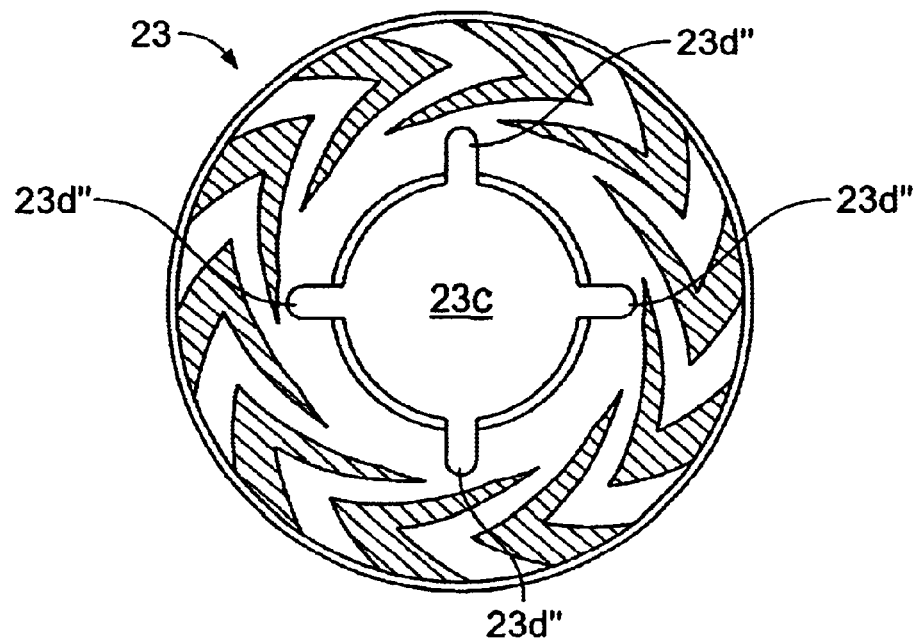
FIG. 14 is an explanatory plan view illustrating still another example of the thrust plate.
Figure 15:
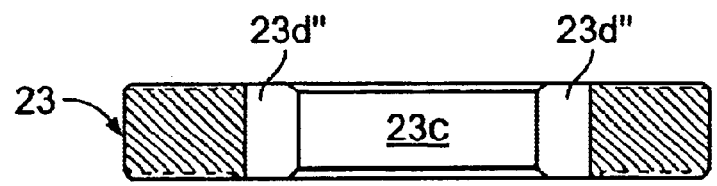
FIG. 15 is an explanatory cross-sectional view of the thrust plate shown in FIG. 14.
Figure 16:
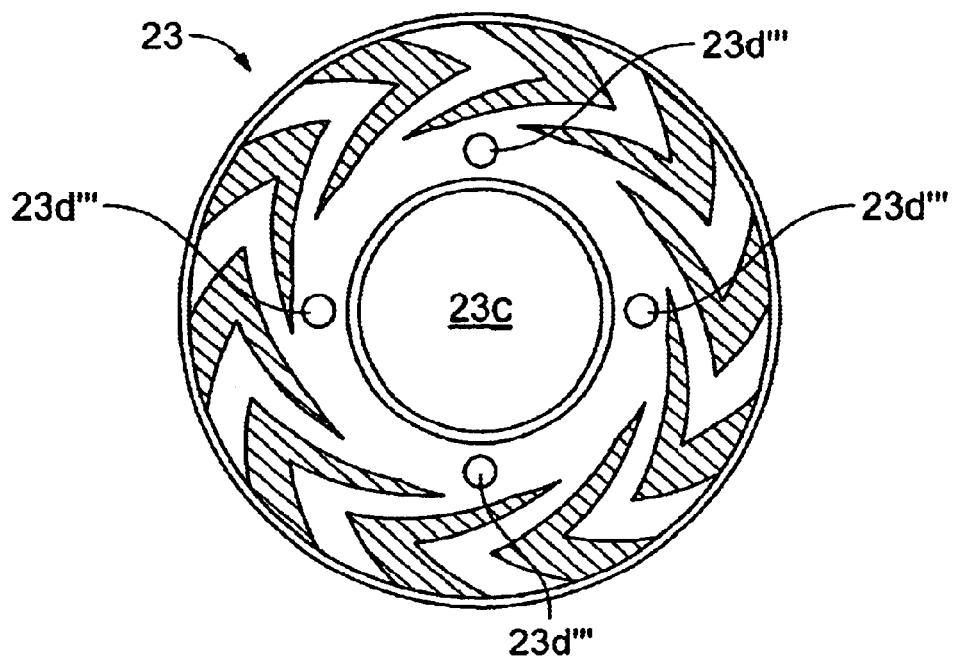
FIG. 16 is an explanatory plan view illustrating a further example of the thrust plate.
Figure 17:
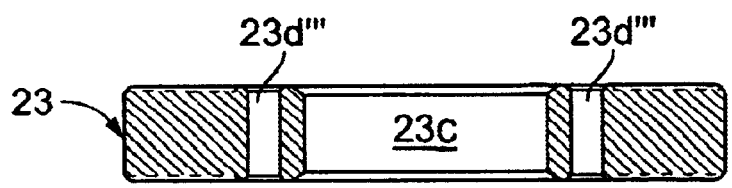
FIG. 17 is an explanatory cross-sectional view of the thrust plate shown in FIG. 16.
Figure 31:
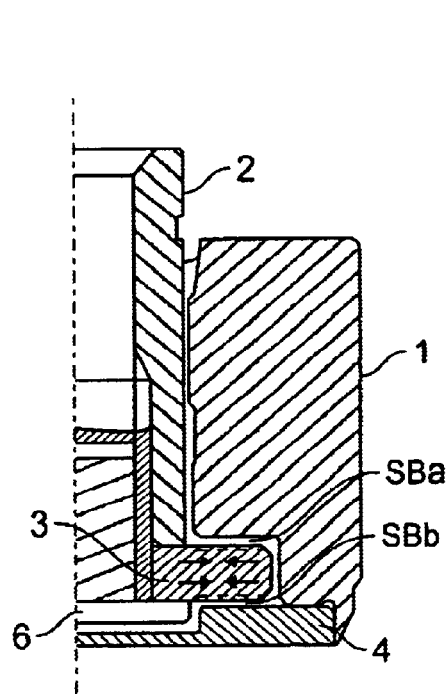
FIG. 31 is an explanatory half vertical sectional view illustrating the state of a case in which no deformation has occurred in the thrust plate in the conventional hydrodynamic bearing device.
Figure 32:
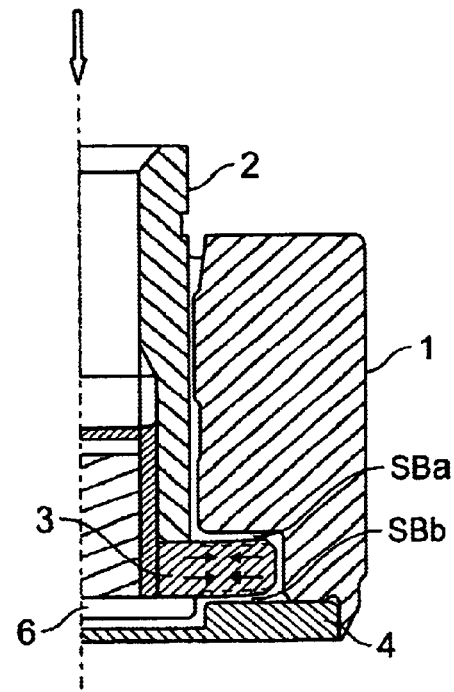
FIG. 32 is an explanatory half vertical sectional view illustrating the state of a case in which deformation has occurred in the thrust plate in the conventional hydrodynamic bearing device.
Figure 33:
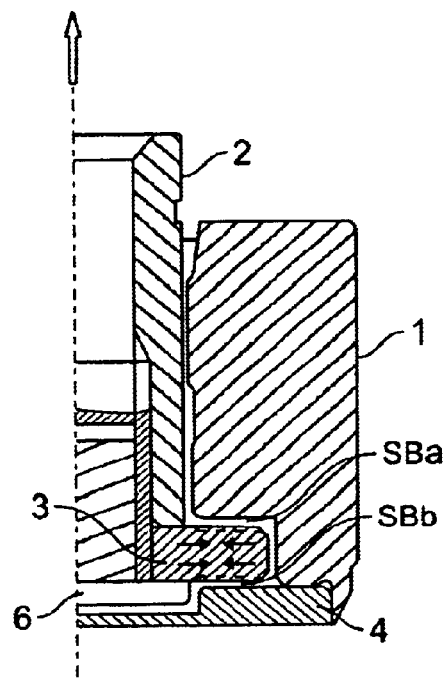
FIG. 33 is an explanatory half vertical sectional view illustrating the state of a case in which deformation has occurred on the opposite side in the conventional hydrodynamic bearing device.

Furthermore, still another embodiment shown in FIGS. 14 and 15 shows a case in which the thrust plate 23 is fastened to the end portion of the rotating shaft 21 by a fixing screw 6 such as the one shown in FIGS. 31 to 33 referred to earlier. In this embodiment, the groove portions 23d'' making up the fluid circulating passages are provided in such a manner as to jut out into a region located radially outwardly of the head of the aforementioned fixing screw 6. Further, in a further embodiment shown in FIGS. 16 and 17, through holes 23d''' making up the fluid circulating passages are formed in the aforementioned region located radially outwardly of the head of the aforementioned fixing screw 6. In such other embodiments as well, it is possible to obtain action and advantages similar to those of the above-described embodiments.

Figure 18:
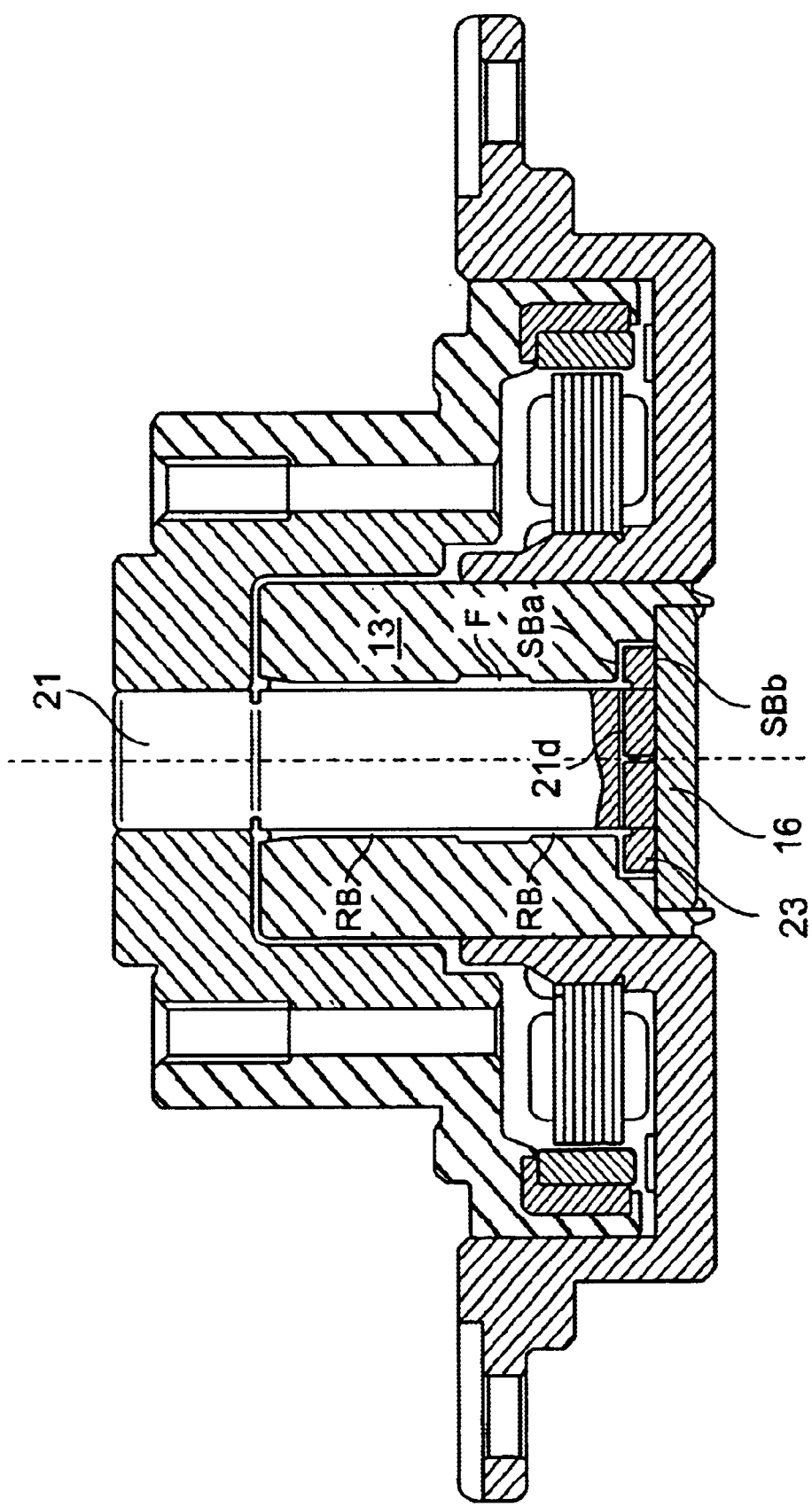
FIG. 18 is an explanatory vertical sectional view illustrating an example of the entire structure of the hard disk drive (HDD) having the shaft rotating-type hydrodynamic bearing device in accordance with a still further embodiment of the invention.

Still further, in a still further embodiment shown in FIG. 18, fluid circulating passages 21d are provided in the interior of the rotating shaft 21, and the pair of upper and lower thrust hydrodynamic bearing portions SBa and SBb are made to communicate with each other by the fluid circulating passages 21d on the rotating shaft 21 side. In such an embodiment as well, it is possible to obtain similar action and advantages.

Figure 19:
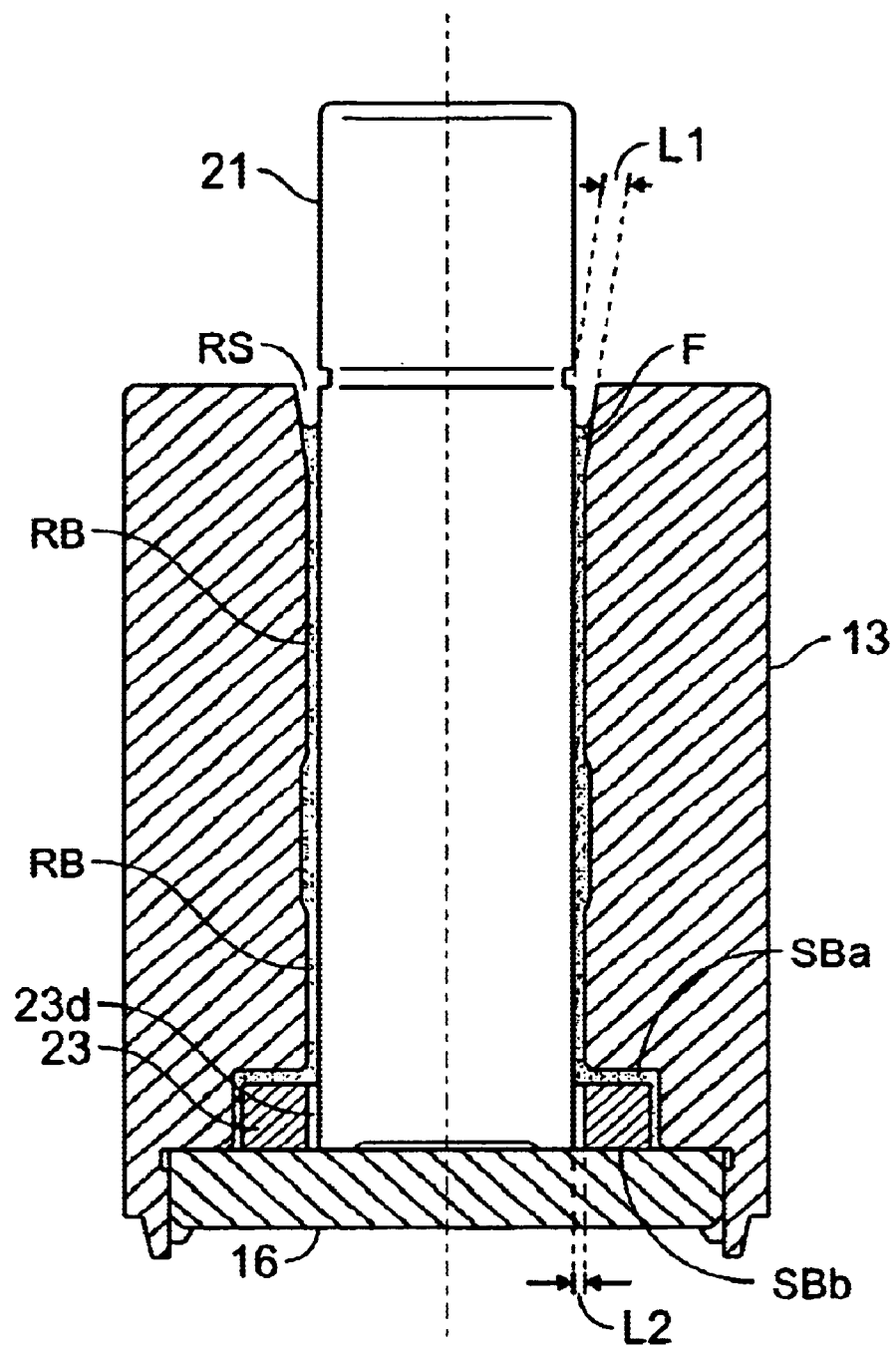
FIG. 19 is an explanatory vertical sectional view illustrating essential portions of the hydrodynamic bearing device in accordance with a further embodiment of the invention.
Figure 29:
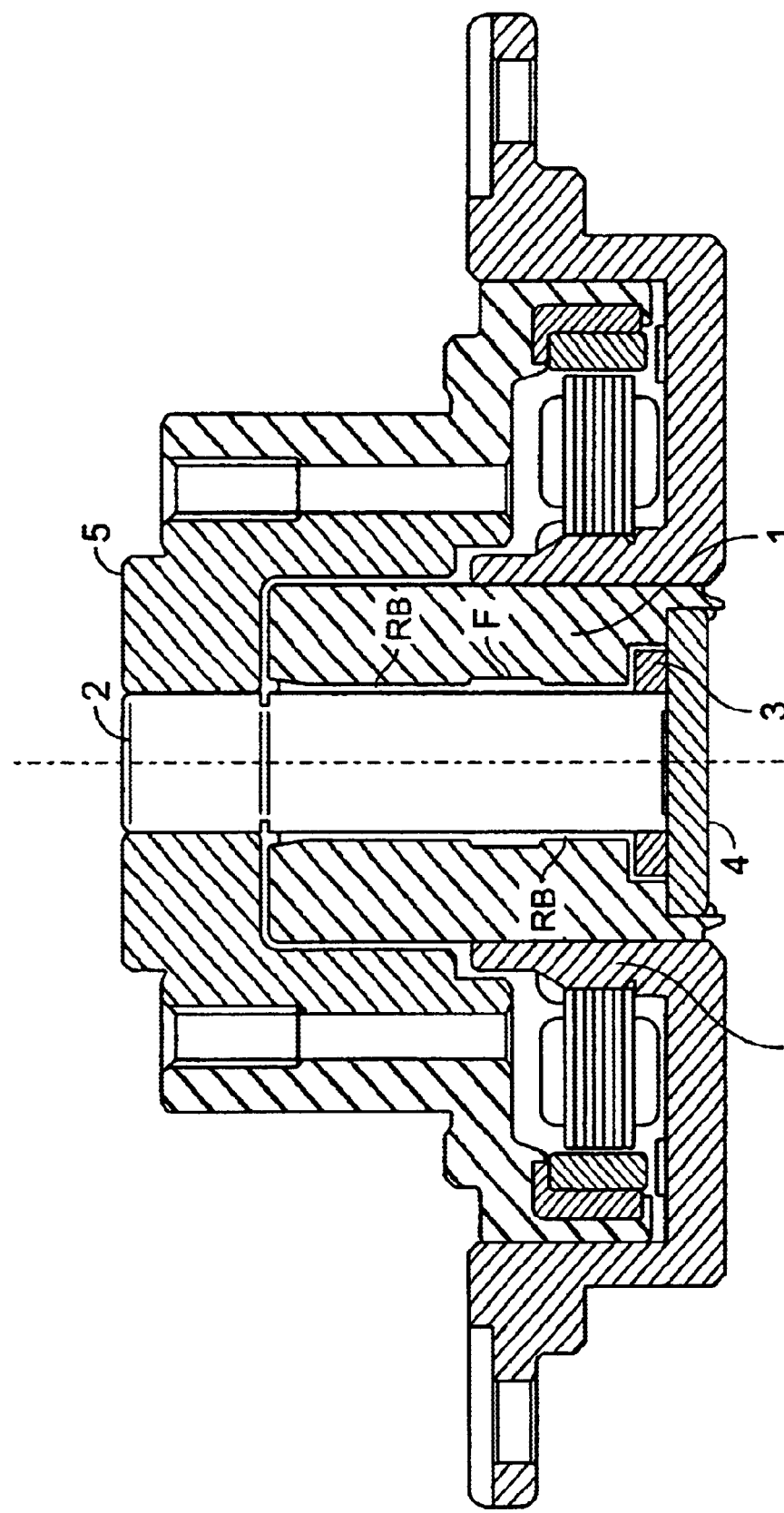
FIG. 29 is an explanatory vertical sectional view illustrating an example of the entire structure of the hard disk drive (HDD) having a general hydrodynamic bearing device.

Furthermore, in a further embodiment shown in FIG. 19, a gap dimension L1 at the liquid level of the lubricating fluid F which is present in the capillary seal portion RS is set with respect to an inside-diameter dimension L2 of the fluid circulating passage 23d in the above-described first embodiment. More specifically, the radius of curvature of the liquid level of the lubricating fluid F in the aforementioned capillary seal portion RS is set in a relationship of being greater than the radius of curvature of the liquid level of the lubricating fluid F in the fluid circulating passage 23d. If these radii of curvature of the liquid level are set in such a dimensional relationship, it becomes possible to extinguish the bubbles occurring in the lubricating fluid F.

Meanwhile, in the embodiments shown in FIGS. 20, 21, and 22, in forming groove portions 33d' making up fluid circulating passages 33d, consideration is given to the bonding strength of a thrust plate 33 with respect to a rotating shaft 31. Namely, as for the thrust plate 33, the inner peripheral wall side of an attaching hole 33c formed by being bored in the thrust plate 33 is joined to the outer peripheral surface of the rotating shaft 31, as described before. At the same time, the groove portions 33d' making up the fluid circulating passages 33d are formed by notching portions for being joined to the rotating shaft 31, which are innermost peripheral portions of the thrust plate 33, i.e., the inner peripheral wall surface of the attaching hole 33c of the thrust plate 33, in such a manner as to form substantially semicircular cross-sectional shapes. Additionally, the arrangement provided is such that the aforementioned fluid circulating passages 33d are defined by the outer peripheral surface of the rotating shaft 31 and the inner peripheral wall surfaces of the groove portions 33d' formed by notching in such a manner as to be open to the outer peripheral surface side of the rotating shaft 31.

Further, the groove portions 33d' making up the fluid circulating passages 33d are disposed in a region located inwardly of the imaginary inner peripheral circle Ci connecting the innermost peripheral ends of the radial regions where thrust dynamic-pressure generating grooves 33a and 33b extend. However, the size of the groove portions 33d' making up those fluid circulating passages 33d, i.e., the total sum of cross-sectional areas of the groove portions 33d' in a direction perpendicular to the flowing direction of the lubricating fluid in the fluid circulating passages 33d, is formed to have a size of such a measure as to be capable of overcoming the pressure imbalance of the lubricating fluid. More specifically, this total sum of the cross-sectional areas of the groove portions 33d' is set to be not less than 3/1000 of the total area of the radial regions where the thrust hydrodynamic bearing portions 33a and 33b extend.

In addition, by taking into consideration the joining strength with respect to the rotating shaft 31, the total sum of the cross-sectional areas of the groove portions 33d' is set to be not more than 1/50 of the total area of the radial regions where the thrust hydrodynamic bearing portions 33a and 33b extend. If the upper limit is thus set, even if the fluid circulating passages 33d are formed in such a manner as to notch the inner peripheral wall surface of the thrust plate 33, the joining strength with respect to the rotating shaft 31 can be secured sufficiently. Namely, in the case where the groove portions 33d' making up the fluid circulating passages 33d are formed by notching the surface of the thrust plate 33 for being joined to the rotating shaft 31, if the number of the groove portions 33d' is gradually increased from two in FIG. 20, to four in FIG. 21, and further to six in FIG. 22, the total cross-sectional area of the fluid circulating passages 33d increases by the number of the groove portions 33d' with respect to the amount of passage of the lubricating fluid, so that this arrangement would be preferable. However, the joining area with respect to the rotating shaft 31 gradually decreases to the contrary, and the joining strength comes to decline. Accordingly, the aforementioned upper limit (not more than 1/50) is provided to ensure that the joining strength of the thrust plate 33 with respect to the rotating shaft 31 does not lack.

For example, in the case where the number of the groove portions 33d' is set to six as in FIG. 22, in a case where an actual design value concerning the total sum of the cross-sectional areas of the groove portions 33d' was set in advance to 0.3876 mm², and the area ratio with respect to the total area of 22.5469 mm² of the radial regions where the thrust hydrodynamic bearing portions 33a and 33b extend was set to 0.001719 (approx. 1/58), it was possible to obtain a sufficient joining strength capable of withstanding actual use.

The same holds true of a case in which the fluid circulating passages 33d are formed by through hole portions 33d'' such as those shown in FIGS. 23, 24, and 25. In this case, in terms of productivity, it would be preferable to decrease the number of holes for such a reason that the number of manufacturing processes decreases. However, if an attempt is made to decrease the number of holes while securing a large passage cross-sectional area, the hole diameter per hole disadvantageously enlarges, as shown in FIGS. 26, 27, and 28, so that the fluid circulating passages 33d' extend over to the radial regions where the thrust hydrodynamic bearing portions 33a and 33b extend. If the innermost peripheral ends of the radial regions where the thrust hydrodynamic bearing portions 33a and 33b extend are enlarged to the radially outward side, the efficiency in the generation of dynamic pressure disadvantageously declines. Accordingly, it is impossible to adopt the structures shown in FIGS. 26, 27, and 28.

While the embodiments of the invention have been specifically described, the invention is not limited by the above-described embodiments, and it goes without saying that various modifications are possible within the scope which does not depart from the gist thereof.

For example, although the thrust plate 23 in the above-described embodiments is joined to the bearing member side by being formed by a separate member, the invention is applicable to an arrangement in which the thrust plate and the bearing member are formed integrally.

In addition, the invention is not limited to the shaft rotating-type hydrodynamic bearing device such as the one in each of the above-described embodiments, and is similarly applicable to a shaft fixed-type hydrodynamic bearing device. In addition, the invention is similarly applicable to hydrodynamic bearing devices which are used for various apparatuses such as a motor for driving a polygonal mirror and a motor for driving a CD-ROM other than the motor for a HDD in the above-described embodiments.

As described above, in the hydrodynamic bearing device, the pair of thrust hydrodynamic bearing portions are made to communicate with each other to form a fluid circulating passage for equalizing a pressure imbalance between the pair of thrust hydrodynamic bearing portions. Therefore, even in a case where a pressure imbalance has occurred in the lubricating fluid inside the thrust hydrodynamic bearing portion due to such a cause as the deformation of the thrust plate, the lubricating fluid is allowed to move between the pair of upper and lower thrust hydrodynamic bearing portions through the fluid circulating passage, thereby overcoming the imbalance in pressure and making it possible to stably obtain the amount of floatation in the thrust hydrodynamic bearing portion. Hence, by virtue of the very simple construction, it is possible to balance the pumping forces in the thrust hydrodynamic bearing portions satisfactorily and speedily, and improve the reliability of the hydrodynamic bearing device.

In addition, in the hydrodynamic bearing device, in addition to the arrangement provided above, a radial hydrodynamic bearing portion is provided for pressurizing the lubricating fluid in the thrust hydrodynamic bearing portion toward a radially inward side, and a bearing space extending from the radial hydrodynamic bearing portion to the thrust hydrodynamic bearing portion is formed into a so-called bag-like space. Therefore, the lubricating fluid is allowed to flow toward the inward side of the thrust hydrodynamic bearing portion, thereby preventing the severance of the lubricating fluid in the thrust hydrodynamic bearing portion. Thus it is possible to reliably obtain the aforementioned advantages and prevent the leakage of the lubricating fluid to the outside.

Furthermore, in the hydrodynamic bearing device, the pair of thrust hydrodynamic bearing portions are made to communicate with each other to form a fluid circulating passage for equalizing a pressure imbalance between the pair of thrust hydrodynamic bearing portions, and a total sum of cross-sectional areas of the fluid circulating passage is set to be not less than 3/1000 of the area of the radial-regions where the dynamic-pressure generating mechanism extends. Accordingly, even in a case where a pressure imbalance has occurred in the lubricating fluid inside the thrust hydrodynamic bearing portion due to such a cause as the deformation of the thrust plate, the lubricating fluid is allowed to move between the pair of upper and lower thrust hydrodynamic bearing portions through the fluid circulating passage, thereby overcoming the imbalance in pressure and making it possible to stably obtain the amount of floatation in the thrust hydrodynamic bearing portion. Hence, by virtue of the very simple construction, it is possible to balance the pumping forces in the thrust hydrodynamic bearing portions satisfactorily and speedily, and improve the reliability of the hydrodynamic bearing device.

In the hydrodynamic bearing device, in addition to the arrangement described above, the fluid circulating passage is defined by an outer peripheral surface of the shaft member and an inner peripheral wall surface of a groove portion formed by notching an innermost peripheral portion of the thrust plate in such a manner as to be open to the side of the shaft member, and the total sum of the cross-sectional areas of the fluid circulating passage in the direction perpendicular to the flowing direction of the lubricating fluid is set to be not more than 1/50 of the area of the radial regions where the dynamic-pressure generating mechanism extends. Thus since the joining strength with respect to the shaft member is satisfactorily maintained, it is possible to obtain the above-described advantages more reliably.

What is claimed is:

1. A hydrodynamic bearing device comprising:
    a bearing member;
    a shaft member fitted relatively rotatably to said bearing member;
    a thrust plate secured to said shaft member;
    a pair of thrust hydrodynamic bearing portions formed by spacing apart both axial end faces of said thrust plate from two of inner faces of said bearing member opposing to said thrust plate in an axial direction of said shaft;
    a dynamic-pressure generating mechanism provided on at least one of a side of said thrust plate and a side of said bearing member in said pair of thrust hydrodynamic bearing portions,
    said dynamic-pressure generating mechanism pressurizing a lubricating fluid provided in each of said thrust hydrodynamic bearing portions with a generated dynamic pressure when said shaft relatively rotates with respect to said bearing member, thereby effecting a supporting action while relatively floating said shaft member from said bearing member in the axial direction by a predetermined amount; and
    a fluid circulating passage communicating with said pair of thrust hydrodynamic bearing portions for equalizing a pressure imbalance between said pair of thrust hydrodynamic bearing portions;

wherein said fluid circulating passage is provided in a region located radially inwardly of an imaginary inner peripheral circle connecting innermost peripheral ends of the radial regions where said dynamic-pressure generating mechanism extends, and a total sum of cross-sectional areas of said fluid circulating passage in a direction perpendicular to a flowing direction of the lubricating fluid is set to be not less than $3/1000$ and not more than $1/50$ of an area of the radial regions where said dynamic-pressure generating mechanism extends.

2. The hydrodynamic bearing device according to claim 1, wherein said fluid circulating passage is defined by an outer peripheral surface of said shaft member and an inner peripheral wall surface of a groove portion formed by notching a portion of said thrust plate for being secured to said bearing member, which is an innermost peripheral portion of said thrust plate, in such a manner as to be open to the outer peripheral surface side of said shaft member.

3. The hydrodynamic bearing device according to claim 2, wherein said groove portion is formed in a semicircular shape.

4. The hydrodynamic bearing device according to claim 3, wherein said thrust plate is secured to said shaft member by shrinkage fit.

5. The hydrodynamic bearing device according to claim 2, wherein a plurality of groove portions are formed on the thrust plate.

6. The hydrodynamic bearing device according to claim 1, wherein said fluid circulating passage is formed such that a flow rate per unit time of the lubricating fluid passing through said fluid circulating passage from one to another one of said pair of thrust hydrodynamic bearing portions becomes greater than the flow rate per unit time of the lubricating fluid passing over a peripheral wall surface of an imaginary circular cylinder which has a bottom surface defined by the imaginary inner peripheral circle and has a relative amount of floatation as the height thereof.

7. The hydrodynamic bearing device according to claim 1, further comprising a radial hydrodynamic bearing portion provided for pressurizing the lubricating fluid in said thrust hydrodynamic bearing portion toward a radially inward side, wherein a bearing space including said radial hydrodynamic bearing portion and said thrust hydrodynamic bearing portions is formed into a bag-like space where a radial hydrodynamic bearing portion side thereof has an opening to an outside and a thrust hydrodynamic bearing portion side thereof is closed.

8. The hydrodynamic bearing device according to claim 1, wherein at least one of said bearing member and said shaft member is provided with grooves having herringbone shapes.

* * * * *